US012020288B2

(12) United States Patent
Le Jouan

(10) Patent No.: US 12,020,288 B2
(45) Date of Patent: *Jun. 25, 2024

(54) SYSTEMS AND METHODS FOR ONLINE ADVERTISING USING USER PREFERENCES

(71) Applicant: Privowny, Inc., Palo Alto, CA (US)

(72) Inventor: Herve Le Jouan, Saint-Cloud (FR)

(73) Assignee: PRIVOWNY, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/348,555

(22) Filed: Jun. 15, 2021

(65) Prior Publication Data

US 2021/0312504 A1     Oct. 7, 2021

Related U.S. Application Data

(63) Continuation of application No. 15/831,261, filed on Dec. 4, 2017, now Pat. No. 11,037,203, which is a continuation of application No. 14/255,953, filed on Apr. 17, 2014, now Pat. No. 11,907,972.

(60) Provisional application No. 61/813,123, filed on Apr. 17, 2013.

(51) Int. Cl.
*G06Q 30/0251* (2023.01)
*G06Q 30/0241* (2023.01)

(52) U.S. Cl.
CPC ..... *G06Q 30/0269* (2013.01); *G06Q 30/0251* (2013.01); *G06Q 30/0255* (2013.01); *G06Q 30/0257* (2013.01); *G06Q 30/0277* (2013.01)

(58) Field of Classification Search
CPC ........... G06Q 30/0269; G06Q 30/0251; G06Q 30/0255; G06Q 30/0257; G06Q 30/0277

USPC ......... 705/14.66; 709/204; 715/810; 725/24
See application file for complete search history.

(56) References Cited

U.S. PATENT DOCUMENTS

| | | | |
|---|---|---|---|
| 5,948,061 | A | 9/1999 | Merriman |
| 8,799,053 | B1 | 8/2014 | Goldberg |
| 2002/0178166 | A1 | 11/2002 | Hsia |
| 2003/0009372 | A1 | 1/2003 | Nyhan |
| 2003/0023481 | A1 | 1/2003 | Calvert |
| 2003/0126013 | A1 | 7/2003 | Shand |

(Continued)

OTHER PUBLICATIONS

American Association of Advertising Agencies, Self-Regulatory Principles for online behavioral advertising, 2007 (Year: 2007).*

(Continued)

*Primary Examiner* — Tarek Elchanti
(74) *Attorney, Agent, or Firm* — Alston & Bird LLP

(57) ABSTRACT

Various implementations described herein provide systems and methods for online advertising and, more particularly, systems and methods that utilize user preferences in providing online advertising. In various implementations, systems or methods described herein facilitate user control of user-related data with respect to online advertisement systems, which can include supply-side platforms (SSPs), advertisement exchanges, demand-side platforms (DSPs), content delivery networks (CDNs), ad networks, or adservers. In some implementations, the system and methods implement or otherwise facilitate a user advertisement preference service that enables online users to manage one or more user advertisement preferences and selectively provide those user advertisement preferences to online advertisement systems.

14 Claims, 13 Drawing Sheets

(56) References Cited

U.S. PATENT DOCUMENTS

| | | |
|---|---|---|
| 2003/0171990 A1 | 9/2003 | Rao |
| 2006/0242009 A1 | 10/2006 | Crolley |
| 2007/0038516 A1 | 2/2007 | Apple |
| 2007/0146812 A1 | 6/2007 | Lawton |
| 2008/0215426 A1 | 9/2008 | Guldimann et al. |
| 2008/0294549 A1 | 11/2008 | Leader |
| 2009/0106096 A1 | 4/2009 | Horowitz |
| 2009/0140035 A1 | 6/2009 | Miller |
| 2009/0210899 A1 | 8/2009 | Lawrence-Apfelbaum |
| 2009/0292608 A1* | 11/2009 | Polachek ........... G06Q 30/0245 715/810 |
| 2009/0307144 A1 | 12/2009 | Tutone |
| 2011/0125565 A1 | 5/2011 | MacIlwaine |
| 2012/0071131 A1 | 3/2012 | Zisapel et al. |
| 2012/0158496 A1 | 6/2012 | Solomon et al. |
| 2012/0197708 A1 | 8/2012 | Mullen et al. |
| 2012/0330748 A1 | 12/2012 | Malik |
| 2013/0014138 A1 | 1/2013 | Bhatia |
| 2013/0014153 A1* | 1/2013 | Bhatia .................... H04H 60/31 725/24 |
| 2013/0066719 A1 | 3/2013 | Kast |
| 2013/0066726 A1 | 3/2013 | Umeda |
| 2013/0091554 A1 | 4/2013 | Kinoshita |
| 2013/0124300 A1 | 5/2013 | Hopwood |
| 2013/0124628 A1* | 5/2013 | Weerasinghe ..... G06Q 30/0241 709/204 |
| 2013/0167085 A1 | 6/2013 | Roundtree et al. |
| 2013/0297716 A1* | 11/2013 | Spittle ................. G06F 16/9535 709/212 |
| 2014/0047043 A1 | 2/2014 | Esfahani |

OTHER PUBLICATIONS

"How RTB AD Serving Works" (published in "Ad Ops Insider" blog on Dec. 15, 2010 at https://www.adopsinsider.com/ad-serving/diagramming-the-ssp-dsp-and-rtb-redirect-path/) (Year: 2010).

* cited by examiner

SYSTEMS AND METHODS FOR ONLINE ADVERTISING USING USER PREFERENCES

CROSS REFERENCE TO RELATED APPLICATIONS

The present application is a continuation of U.S. patent application Ser. No. 15/831,261 filed Dec. 4, 2017 and entitled "Systems and Methods for Online Advertising Using User Preferences," which is a continuation of U.S. patent application Ser. No. 14/255,953 filed Apr. 17, 2014 and entitled "Systems and Methods for Online Advertising Using User Preferences," which claims the benefit of U.S. Provisional Patent Application Ser. No. 61/813,123 filed Apr. 17, 2013 and entitled "User Centric Advertising Preferences Platform to Inject into the Ad Eco System," which are hereby incorporated by reference herein.

BACKGROUND

1. Technical Field

Various embodiments of the present invention(s) relate to systems and methods for online advertising and, more particularly, systems and methods that utilize user preferences in providing online advertising.

2. Description of Related Art

Online Behavior Advertising (OBA) is a well-known practice by which companies gather information about a user's online activity and use that information to show that user ads that are relevant to the user. Cookies are just one way in which companies can track what web pages users visit and user activity on such web pages (e.g., clicking online advertisements, clicking web links, submitting searches, etc.). Cookies and other types of trackers usually limit the information gathered to generalized facts regarding the user (e.g., age group, gender, user interests, etc.) and usually avoid gathering specific personal information (e.g., name, address, phone number, etc.). Nevertheless, given the importance of personal privacy in today's society, particularly with respect to information being gathered during online activities, the ability for online users to control what (or what type of) information is gather about them during online activities has never been more important. Online advertisement blockers, disabling trackers (e.g., disabling cookies), and browser privacy settings (e.g., "Do Not Track" options) are just some of the ways online users already exercise such control.

The foregoing examples of the related art and limitations related therewith are intended to be illustrative and not exclusive. Other limitations of the relevant art will become apparent to those of skill in the art upon a reading of the specification and a study of the drawings.

SUMMARY OF EMBODIMENTS

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations described herein provide systems and methods for online advertising and, more particularly, systems and methods that utilize user preferences in providing online advertising. In various implementations, systems or methods described herein facilitate user control of user-related data with respect to online advertisement systems, which can include supply-side platforms (SSPs), advertisement exchanges, demand-side platforms (DSPs), content delivery networks (CDNs), ad networks, or adservers.

In some implementations, the system and methods implement or otherwise facilitate a user advertisement preference service that enables online users to manage one or more user advertisement preferences and selectively provide those user advertisement preferences to online advertisement systems. For some implementations, a user at a client device can authenticate with the service and visit a website, which results in the service issuing a web browser cookie to the client device. The web browser cookie can include a unique user identifier (ID) that is associated with the authenticated user. The web browser cookie can also include one or more variables relating to the authenticated user's advertisement preference, such a Boolean variable indicating whether the authenticated user has any saved user advertisement preferences at the moment. For some implementations, when the authenticated user at a client device visits a web page that includes a request for online advertisement from online advertisement systems, the web browser cookie is sent to the online advertisement systems as part of the request process. The online advertisement systems, in turn, can utilize the unique user ID contained in the web browser cookie to obtain one or more user advertisement preferences associated with the authenticated user corresponding to the unique user ID. Depending on the implementation, the service may or may not have pushed the user advertisement preferences with its associated unique user ID to the online advertisement system in advance of the request for the online advertisement. In some implementations, the online advertisement systems request one or more user advertisement preference from the service using the unique user ID.

For management of user advertisement preferences, the client device can include a client-side engine (e.g., accessed as a web browser plugin or through APIs) configured to provide access to user advertisement preferences (e.g., through an icon included over or adjacent to each online advertisement presented in a web page). By accessing the user advertisement preferences using the client-side engine, an authenticated user can review, add, remove, or modify various user advertisement preferences. The client-side engine may be further configured monitor for online advertisements (e.g., those presented in a web page through a web browser) and filter the user advertisement preferences presented for access to those relating to the online advertisement currently displayed. The client-engine can detect the web browser cookie and utilize data contain therein, such as the unique user ID, to facilitate management of user advertisement preferences for the authenticated user. For example, as the authenticated user interacts with user advertisement preferences (e.g., create new preferences or modify existing preferences) through the client-side engine (e.g., through a graphic user interface provided by the client-side engine), the client-side engine can communicate changes to the user advertisement preferences to the user advertisement preference service (e.g., a server implementing the service).

These and other advantages will become apparent to those skilled in the relevant art upon a reading of the following descriptions and a study of the several examples of the drawings.

Figure 1:
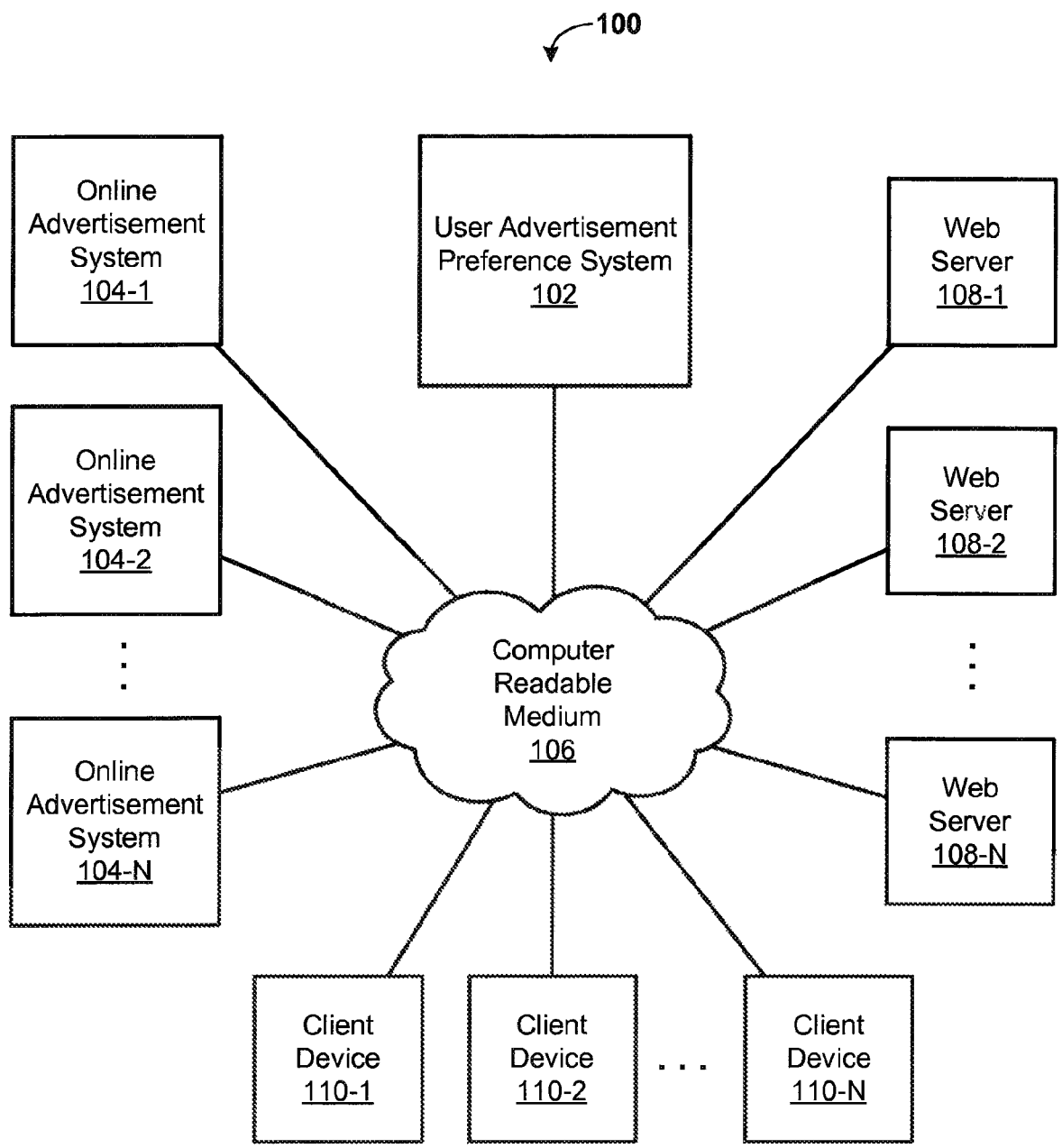
FIG. 1 is a block diagram illustrating an example environment that includes a user advertisement preference system in accordance with some implementations.

The figures are not intended to be exhaustive or to limit the embodiments to the precise form disclosed. It should be understood that various implementations may be practiced with modification and alteration.

DETAILED DESCRIPTION OF VARIOUS EMBODIMENTS

Various implementations described herein provide systems and methods for online advertising and, more particularly, systems and methods that utilize user preferences in providing online advertising. In various implementations, systems or methods described herein facilitate user control of user-related data with respect to online advertisement systems, which can include supply-side platforms (SSPs), advertisement exchanges, demand-side platforms (DSPs), content delivery networks (CDNs), ad networks, or adservers.

Depending on the implementation, the user can control whether an online advertisement system receives user-related data, and what user-related data is provided to an online advertisement system. For some implementations, the user-related data includes one or more preferences a particular user has with respect to receiving online advertisements (hereafter, referred to as user advertisement preferences). By managing such user advertisement preferences (e.g., creating new preferences, or removing or modifying existing preferences), a user can effectively control what user-related data provided to online advertisement systems. Additionally, use of such user advertisement preferences can benefit online advertisement systems by providing them with richer user profiles containing trusted, user-related data provided gathered directly from online users (in the form of user preferences). With richer user profiles, online advertisement systems can better select and provide online advertising that is relevant to online users, thereby optimizing the selection and delivery process of online advertising, improving advertising quality, and improving return on investment (ROI).

In one implementation, a web browser user is sent an invitation to create an account with the user advertisement preferences service, and installs (at their client device) a web browser plug-in (e.g., add-on) configured to interact with the service and facilitate client-side operations. Once the web browser user has authenticated with the service (i.e., is an authenticated user), a subsequent visit to a website can cause the web browser plug-in to display one or more graphical user interface (GUIs) elements, possibly on or near each online advertisement displayed in the website, to provide access to user advertisement preferences. The GUI elements can include a menu bar (e.g., floating), visual overlays over the ads (e.g., small icon included in the corner of each online advertisement), a pop-up menu, and the like. For some implementations, the GUI is provided through a separate web browser window, which may be invoked when access to user advertisement preferences is appropriate.

Depending on the implementation, the icon may only display with respect to those online advertisement originating from an online advertisement network affiliated with the user advertisement preferences service (e.g., those ad networks that are subscribed to and utilize the user advertisement preferences service).

Each icon displayed can provide the authenticated user access to user advertisement preferences related to a particular online advertisement being displayed on the website, or a group of online advertisements being displayed on the website. When accessing the user advertisement preferences, the authenticated user can add, remove, or modify user advertisement preferences. For example, where a given online advertisement relates to a motor vehicle, the user advertisement preferences presented with respect to the given online advertisement can include one or more of the following kind of preference options: "I already bought a car"; "I just bought a car so no car ads for 2 years"; "I am not interested in cars"; "I am not interested by this car brand"; "I do not want to receive any targeted ads"; "Take My Ads Preference Settings Menu"; and "Share this Ad with a friend." Based on the user selection of the preference option, the web browser plug-in can cause the user advertisement preference saved by the service to be updated accordingly.

In some implementations, when an authenticated user accesses a website, a window popup is displayed to provide a listing of online advertisements including on the website. The listing may be according to brand, product category, product, and the like. Through the window popup, the authenticated user can access user advertisement preferences with respect to the online advertisements, and select such preference options as: "I already bought such a product"; "I am not interested in this product category"; "I am not interested by this brand"; "I am not interested by this retailer"; "I do not want to receive any targeted ads"; and the like.

In various implementations, where a non-authenticated user attempts to access user advertisement preferences (e.g., an icon shown on an online advertisement), the user can be directed to sign-up to the user advertisement service and invited to install the web browser plug-in. In some implementations, until the web brown plug-in is installed, a user may not access user advertisement preferences options or such options are shown to be disabled (e.g., when the user clicks on an icon associated with the user advertisement preference service that is included with the display of an online advertisement).

FIG. 1 is a block diagram 100 illustrating an example environment that includes a user advertisement preference system 102 in accordance with some implementations. In particular implementations, the user advertisement preference system 102 depicted in FIG. 1 facilitates a user advertisement preference service whereby a user can provide one or more user advertisement preferences to the service and the service can provide those preferences to online advertisement systems. The example system shown in FIG. 1 includes a user advertisement preference system 102, one or more online advertisement systems 104-1 thru 104-N hereafter, collectively referred to as the online advertisement systems 104), a computer-readable medium 106, a web servers 108-1 thru 108-N (hereafter, collectively referred to as the web servers 108), and one or more client devices 110-1 thru 110-N (hereafter, collectively referred to as the client devices 110). As shown in FIG. 1, each of the user advertisement preference system 102, the online advertisement systems 104, the web servers 108, and the client devices 110 are communicatively coupled through the computer-readable medium 106.

As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the computer-readable medium 106 can represent a bus or other memory device on a computer that includes one or more of the other components illustrated as coupled to the computer-readable medium 106 in the example of FIG. 1. Where the computer-readable medium 106 includes more than one computing device, the computer-readable medium 106 would typically be characterized as including a "network." The computer-readable medium 106 can include wired and wireless networks. In a wired communications context, the computer-readable medium 106 can include a wired network, such as a local area network (LAN) or wide area network (WAN). In a wireless communications context, the computer-readable medium 104 can include a wireless LAN (WLAN).

Assuming the computer-readable medium 106 includes a network, the network can be practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, the network 106 can include, for example, a WAN, metropolitan area network (MAN), campus area network (CAN), or LAN, but the network 106 could at least theoretically be of any size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office or headquarters and optional branch or regional offices (collectively, offices). Many offices enable remote users to connect to the private network offices via some other network, such as the Internet. The example of FIG. 1 is intended to illustrate a computer-readable medium 106 that may or may not include more than one private network.

The user advertisement preference system 102, the online advertisement systems 104, the web servers 108, the client devices 110, and other systems or devices described in this paper, can be implemented by one or more a computer systems or as part of one or more computer systems. A computer system, as used in this paper, is intended to be construed broadly and can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific, configuration specific, or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the FIGs. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

In the example shown in FIG. 1, the user advertisement preference system 102 is coupled to the computer-readable medium 106, through which the user advertisement preference system 102 can communicate with one or more of the online advertisement systems 104, the web servers 108, and the client devices 110. Depending on the implementation, the user advertisement preference system 102 can be implemented as part of an online advertisement network or can be implemented as a service affiliated with other online advertisement services (e.g., that selection, place or deliver online advertisements).

In some implementations, the user advertisement preference system 102 is configured to authenticate a web browser user located at one of the client devices 110 (e.g., the client device 110-1). As used herein, an authenticated web browser user (or authenticated user) is considered a web browser user that has been successfully authenticated. Upon successful authentication, the user advertisement preference system 102 can provide the client device (e.g., the client device 110-1) with a web browser cookie including a unique user identifier associated with the authenticated web browser user. Additionally, the user advertisement preference system 102 can receive from the client device (e.g., the client device 110-1) a user advertisement preference associated with the authenticated web browser user. The user advertisement preference receive can be one that is newly created or can be an existing one that has been modified. Upon receiving the user advertisement preference from the client device, the user advertisement preference system 102 can store the user advertisement preference and may do so in association with the unique user identified associated with authenticated web browser user. In this way, when one of the online advertisement systems 104 receives a given unique user identifier (e.g., by way of a web browser cookie) and intends to obtain user advertisement preferences associated with a web browser user associated with a given web browser user, the given unique user identifier can be utilized to obtain the user advertisement preferences from the user advertisement preference system 102. Depending on the implementation, the user advertisement preference system 102 may provide user advertisement preferences to one or more of the online advertisement systems 104 by pushing user advertisement preferences to the online advertisement systems 104 as user advertisement preferences are created or modified. This push of user advertisement preferences can occur in advance of the online advertisement systems 104 receiving request for online advertisements with a web browser cookie containing a unique user ID. In some implementations, the user advertisement preference system 102 provides user advertisement preferences to one or more of the online advertisement systems 104 based on specific requests from the online advertisement systems 104. For example, when the online advertisement systems 104-2 has received a request for online advertisement from the client device 104-2 and the request has an associated web browser cookie containing a specific unique user ID, the online advertisement systems 104-2 can send a request to the user advertisement preference system 102 for user advertisement preferences associated with the specific unique user ID (which the user advertisement preference system 102 may then provide the online advertisement systems 104-2).

In the example shown in FIG. 1, the online advertisement systems 104 are coupled to the computer-readable medium 106, through which each of the online advertisement systems 104 can communicate with one or more of the user advertisement preference system 102, the web servers 108, and the client devices 110. Depending on the implementation, the online advertisement systems 104 can include supply-side platforms (SSPs), advertisement exchanges, demand-side platforms (DSPs), content delivery networks (CDNs), ad networks, or adservers (e.g., publisher adservers and marketer adservers). In some implementations, one or more of the online advertisement systems 104 are configured to receive one or more requests for online advertisements (e.g., from web browsers at one or more of the client devices 110), select one or more online advertisements based on the request, and provide the selected online advertisements (e.g., to the one or more of the client devices 110). The requests for the online advertisements can include those made by client devices based on code included in a web page (e.g., HTML code including an advertisement tag) and can also include those made by applications (e.g., mobile game and application) that utilize third-party online advertisement services to obtain online advertisement impressions.

In the example shown in FIG. 1, the web servers 108 are coupled to the computer-readable medium 106, through which each of the web servers 108 can communicate with one or more of the user advertisement preference system 102, the online advertisement systems 104, and the client devices 110. In some implementations, the web servers 108 are configured to serve web pages to one or more of the client devices 110, which may or may not be access such web pages through a web browser or other web-based application (e.g., Spotify®). The web pages served by the web servers 108 can include those containing references or code to third-party online advertisement services, which may be implemented by one or more of the online advertisement systems 104. Such references or code can cause one or more of the online advertisement systems 104 to receive a web browser cookie containing a unique user ID associated with a particular web browser user. As described herein, one or more of the online advertisement systems 104 can use the unique user ID to obtain one or more user advertisement preferences from the user advertisement preference system 102.

In the example shown in FIG. 1, the client devices 110 are coupled to the remote gateway device 106, through which each of the client devices 110 communicate with one or more of the user advertisement preference system 102, the online advertisement systems 104, and the web servers 108. Depending upon the specific implementation, one or more of the client devices 110 can be: a mobile device, such as a smart phone, personal digital assistant (PDA), or wearable electronic device; a semi-mobile device, such as a notebook or laptop computer, or other device that is generally considered portable; or a device generally not considered to be mobile, such as a desktop computer. Additionally, for some implementations, one or more of the client devices 110 are a thin client device or an ultra-thin client device.

In the example shown in FIG. 1, one or more of the client devices 110 can include a web browser, or similar application, that enables a given client device to request and then receive a web page, or similar web content, from one or more of the web servers 108. The web page (or similar web content) can contain a reference or code that causes the request of one or more online advertisements from one or more of the online advertisement systems 104. It will be understood that a web page can include any web content that utilizes, references, or otherwise causes the request of an online advertisement from an online advertisement system.

In some implementations, a web browser user at least one of the client devices 110 (e.g., the client device 110-1) is authenticated by the user advertisement preference system 102. The authentication can be facilitated at the client device (e.g., the client device 110-1) by way a client-side engine, such as a web browser plug-in, installed at the client device. Once authenticated, the client device (e.g., the client device 110-1) can receive a web browser cookie from the user advertisement preference system 102, where the web browser cookie includes a unique user identifier associated with the authenticated web browser user. This web browser cookie can be stored at the client device (e.g., the client device 110-1) and subsequently used in connection with requests for requests for online advertisements (e.g., ads included in web pages) to the online advertisement systems 104. For example, a web browser at the client device (e.g., the client device 110-1) can request and receive a web page from one of the web servers 108, and subsequently make one or more requests, based on the code included in the web page, for online advertisements from one or more of the online advertisement systems 104. When requests for the online advertisements are made, the client device (e.g., the client device 110-1) can provide one or more of the online advertisement systems 104 with the web browser cookie obtained from the user advertisement preference system 102. In response to the one or more requests, the client device (e.g., the client device 110-1) can receive one or more online advertisements that were selected by the one or more of the online advertisement systems 104 using user advertisement preferences associated with the unique user ID included in the web browser cookie. As described herein, once one of the online advertisement systems 104 has received the web browser cookie, it can use the unique user ID to access user advertisement preferences associated with unique user ID (and therefore the authenticated web browser user).

In some implementations, one or more of the client devices 110 include a client-side engine that facilitate access to user advertisement preferences stored at the user advertisement preference system 102 in connection with web browser users. The client-side engine of a given client device (e.g., the client device 110-1) can be configured to monitor online advertisements received and displayed at the client device and provide access to user advertisement preferences based on the online advertisements displayed. For some implementations, the user advertisement preferences are limited to those online advertisements originating from online advertisement providers affiliated with the user advertisement preference system 102 (e.g., partnered with or subscribed to the service provided by the user advertisement preference system 102). For some implementations, online advertisements originating from online advertisement providers that utilize one or more services provided by the user advertisement preference system 102 include a small icon (e.g., GIF) in the online advertisements. Through such an icon, a web browser user at a client device (e.g., the client device 110-1) can click on the icon and access user advertisement preferences relating to the online advertisement over which the icon is displayed.

Figure 2:
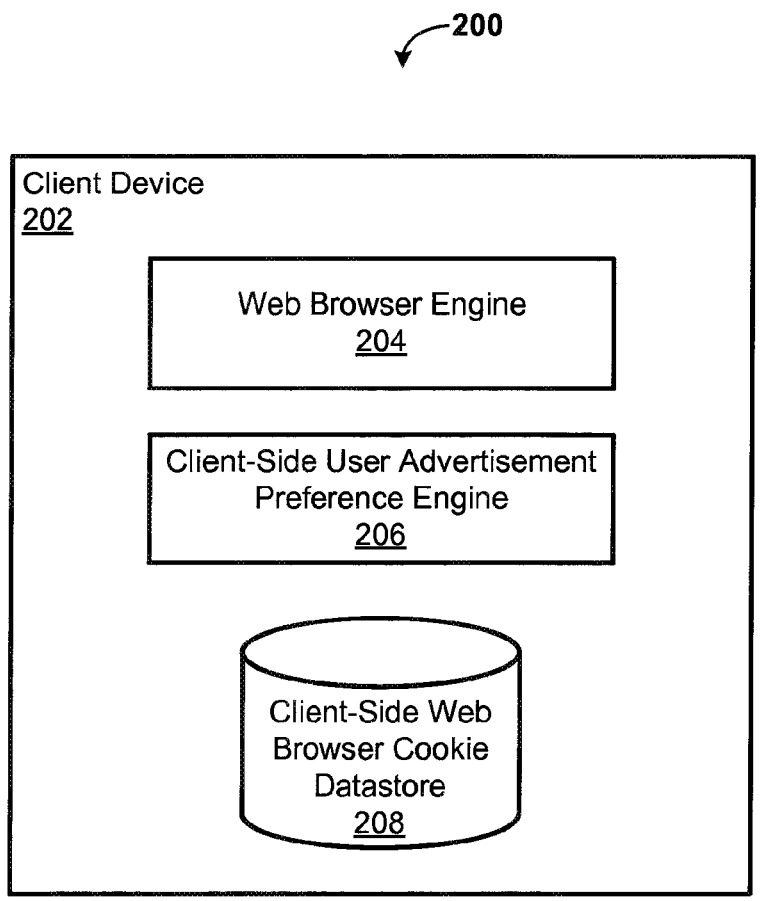
FIG. 2 is a block diagram illustrating an example client device in accordance with some implementations.

FIG. 2 is a block diagram 200 illustrating an example client device 202 in accordance with some implementations. The example device 202 shown in FIG. 2 includes a web browser engine 204, a client-side user advertisement preference engine 206, and a client-side web browser cookie datastore 208. The web browser 204 can include a web browser (e.g., Firefox®, Internet Explorer®, etc.) or any application that utilizes web-based content. A web browser user at the client device 202 can instruct the web browser to visit a website, which can result in a web page being received by the client device 202. The web browser 204 can display the web page by requesting and receiving external content referenced in the web page, including images and online advertisements. A given web page can include one or more online advertisement slots available for filling with an online advertisement. In order to facilitate the filling process, the web page can reference (e.g., include online advertisement tags) to online advertising systems (e.g., publisher adservers, SSPs, etc.) that can provide an online advertisement for the slot. As the web browser requests and display web pages, web browser cookies received at the client device 202 can be stored in (and later retrieved from) the client-side web browser cookie datastore 208. The client-side user advertisement preference engine 206 can be configured to perform one or more operations at the client device 202 relating to the user advertisement preference service described herein. More regarding the client-side user advertisement preference engine 206 is discussed with respect to FIG. 3.

Figure 3:
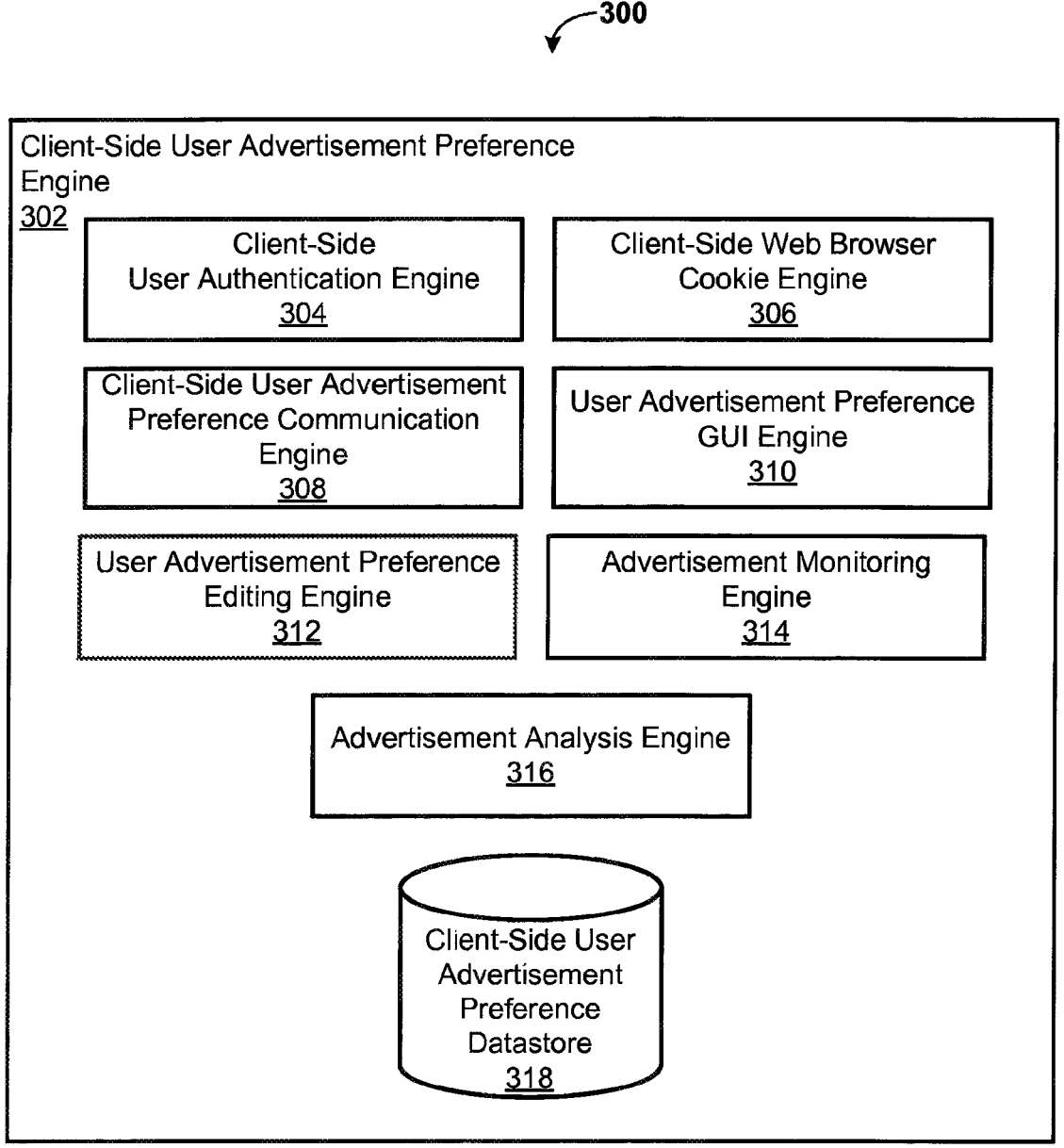
FIG. 3 is a block diagram illustrating an example client-side user advertisement preference engine in accordance with some implementations.

FIG. 3 is a block diagram 300 illustrating an example client-side user advertisement preference engine 302 in accordance with some implementations. The example engine 302 shown in FIG. 3 includes a client-side user authentication engine 304, a client-side web browser cookie engine 306, a client-side user advertisement preference communication engine 308, a user advertisement preference graphical user interface (GUI) engine 310, a user advertisement preference editing engine 312, an advertisement monitoring engine 314, an advertisement analysis engine 316, and a client-side user advertisement preference datastore 318.

In the example shown in FIG. 3, the client-side user authentication engine 304 can be configured to facilitate authentication of a web browser user at a client device with a user advertisement system. The client-side web browser cookie engine 306 can be configured to receive a web browser cookie from the user advertisement preference system and store the web browser cookie at the client device (e.g., in the client-side user advertisement preference datastore 318, or in the web cache of a web browser). The client-side user advertisement preference communication engine 308 can be configured to communicate one or more newly created or modified user advertisements preferences from the client device (e.g., stored on the client-side user advertisement preference datastore 318) to the user advertisement preference system. The user advertisement preference graphical user interface (GUI) engine 310 can be configured to provide a GUI at the client device that can facilitate access to one or more user advertisement preferences by a web browser user at the client device, and that can facilitate access to one or more features of the user advertisement system (e.g., web browser user authentication, user settings, etc.). While accessing the user advertisement preference through a GUI, a web browser can provide user inputs to the GUI that result in the addition, removal, or modification of a user advertisement preference. The user advertisement preference editing engine 312 can be configured to facilitate adding, removing, or modifying a user advertisement preference. A GUI provided by the user advertisement preference GUI engine 310 can facilitate a web browser user's access to the features and functionality of the user advertisement preference editing engine 312. The advertisement monitoring engine 314 can be configured to monitor and detect online advertisements displayed in a web page, cause the advertisement analysis engine 316 to analyze the characteristics of the displayed online advertisements, and present a filtered list of user advertisement preferences relating to the displayed online advertisements. The client-side user advertisement preference datastore 318 can be configured to data utilized by the various components of the client-side user advertisement preference engine 302, including user advertisement preferences saved on a user advertisement preference system and provided to the client device for review by the web browser user. The data can also include user advertisement preferences newly created at the client device, and those user advertisement preferences modified at the client device.

Figure 4:
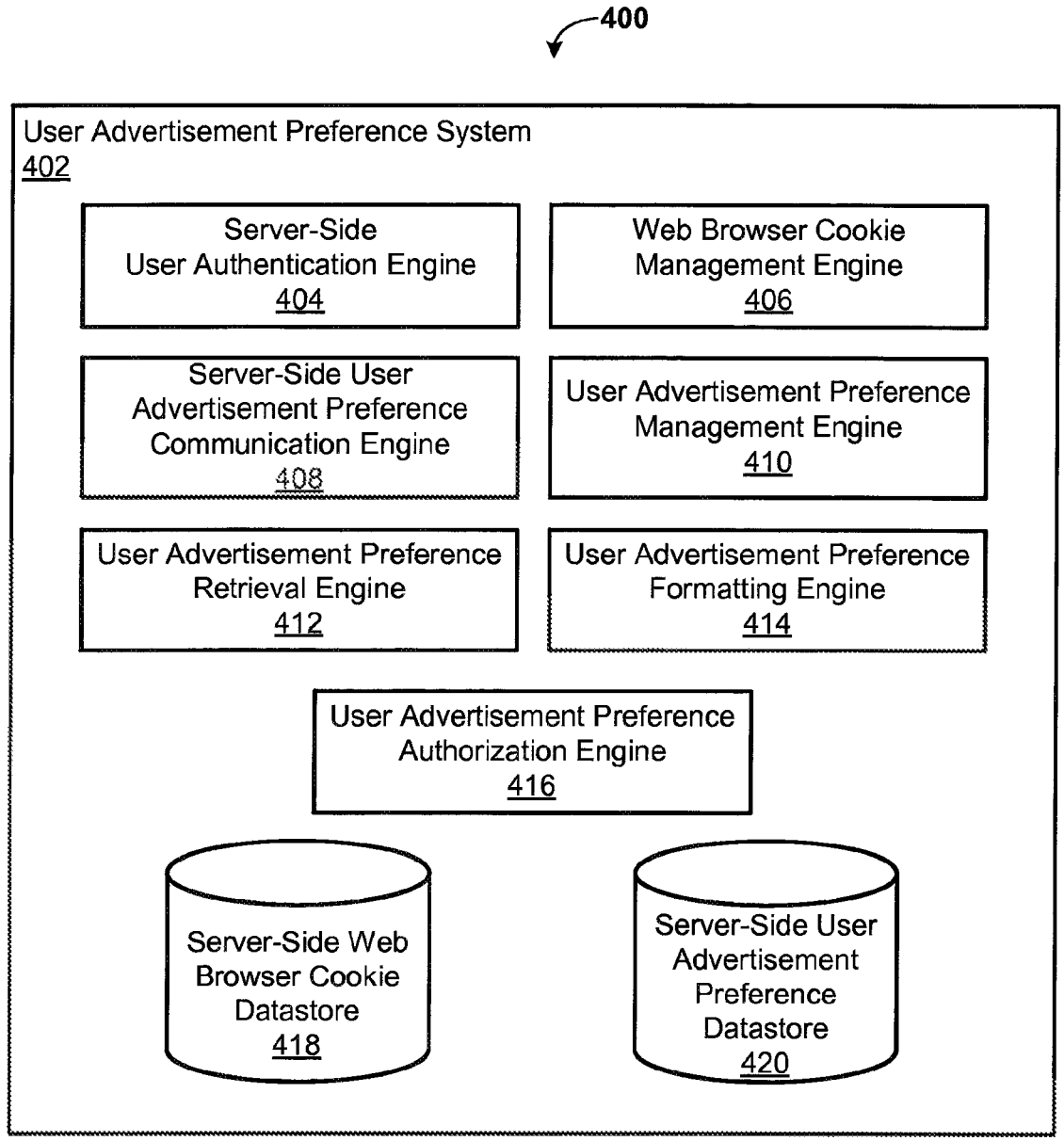
FIG. 4 is a block diagram illustrating an example (server-side) user advertisement preference system in accordance with some implementations.

FIG. 4 is a block diagram 400 illustrating an example (server-side) user advertisement preference system 402 in accordance with some implementations. The example system 402 shown in FIG. 4 includes a server-side user authentication engine 404, a web browser cookie management engine 406, a server-side user advertisement preference communication engine 408, a user advertisement preference management engine 410, a user advertisement preference retrieval engine 412, a user advertisement preference formatting engine 414, a user advertisement authorization engine 416, a server-side web browser cookie datastore 418, and a server-side user advertisement preference datastore 420.

In the example shown in FIG. 4, the server-side user authentication engine 404 can be configured to facilitate authentication of a web browser user at a client device with the user advertisement system 402. The web browser cookie management engine 406 can be configured to facilitate the creation and provisioning of web browser cookies, which can include generation of unique user IDs for web browser users and generation of other cookie data included in web browser cookies. Once generated, the web browser cookie management engine 406 can issue the web browser cookie to a client device, and can be store the issued web browser cookie on the server-side web browser cookie datastore 418. The server-side user advertisement preference communication engine 408 can be configured to receive a client device one or more user advertisements preferences that newly created or modified at the client device. The user advertisement preference management engine 410 can be configured to manage adding, removing, and modifying (e.g., updating) user advertisement preferences stored at the user advertisement system 402. The server-side user advertisement preference datastore 420 may or may not be utilized at the user advertisement system 402 for storing added, removed, and modified user advertisement preferences. The user advertisement preference retrieval engine 412 can be configured to retrieve one or more user advertisement preferences associated with a unique user ID, and providing those user advertisement preferences to an online advertisement system (e.g., through the server-side user advertisement preference communication engine 408). The user advertisement preference formatting engine 414 can be configured to determine a format for providing one or more user advertisement preferences to an online advertisement system, and can be further configured to apply the determined format before the user advertisement preferences are sent to the online advertisement. The user advertisement authorization engine 416 can be configured to request permission from a web browser user (e.g., at a client device) before one or more user advertisement preferences are provided to an online advertisement system.

Figure 5:
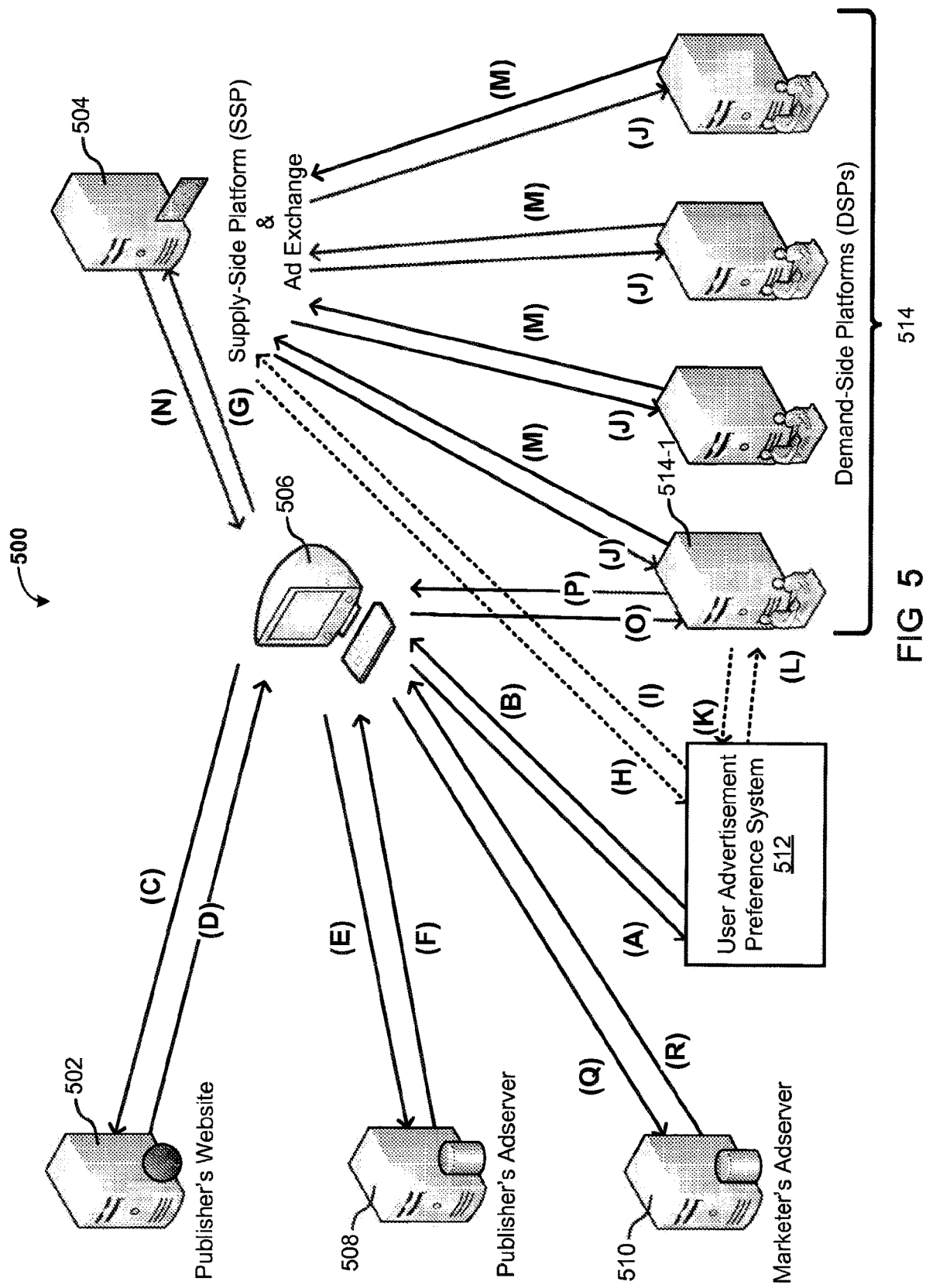
FIG. 5 is flow diagram illustrating operation of an example user advertisement preference system in accordance with some implementations.

FIG. 5 is flow diagram 500 illustrating operation of an example user advertisement preference system 512 in accordance with some implementations. FIG. 5 includes a publisher's website 502, a supply-side platform (SSP) and ad exchange 504 (hereafter, the SSP 504), a client device 506, a publisher's adserver 508, a marketer's adserver 510, the user advertisement preference system 512, and one or more demand-side platforms (DSPs) 514. As illustrated in FIG. 5, a web browser user at the client device 506 can request authentication (A) and once authenticated, the client device 506 can receive a web browser cookie (B) including a unique user ID associated with the authenticated web browser user. Subsequently, when the web browser user at the client device 506 visits (C) a website served by the publisher's website 502, the client device 506 can receive a web page (D) of the website. Based on code included in the web page (e.g., an online advertisement tag), the client device 506 can request (E) an online advertisement from the publisher's adserver 508 for an online advertisement slot (hereafter, ad slot) available on the web page to be displayed on the client device 506. The publisher's adserver 508 in turn can send the client device 506 a redirect (e.g., an online advertisement tag) (F) to the SSP 504 for obtaining the online advertisement for the available ad slot. Based on the redirect from the publisher's adserver 508, the client device 506 can send a request (G) for an online advertisement from the SSP 504.

In response to the request from the client device 506, the SSP 504 can establish a real-time based (RTB) auction for ad slot available on the web page. In some implementations, the client device 506 can provide the SSP 504 with the web browser cookie, and the SSP 504 can use the unique user ID contained therein to request (H) and then receive (I) one or more user advertisement preferences (associated with the unique user ID and, thus, also associated the authenticated web browser user) from the user advertisement preference system 512. It will be understood that the web browser cookie received from the client device 506 and containing the unique user ID is different from any SSP cookie or DSP cookie that the client device 506 may or may not provide to the SSP 504. Using the user advertisement preferences (e.g., products, brands, retailers, services, product/service categories, etc.) obtained (I) from the user advertisement preference system 512, the SSP 504 can better price the ad slot available on the web page. Depending on the implementation, where the client device 506 provides the SSP 504 with both the web browser cookie and the SSP cookie, the SSP 504 may utilize only the web browser cookie (and the associated user advertisement preferences) in pricing the ad slot, or utilize information provided by both the user advertisement preferences and the SSP cookie.

Once the auction for the ad slot, the SSP 504 can inform (J) one or more of the DSPs 514 of the auction and opens the option for bidding by the DSPs 514. While informing (J) the DSPs 514 of the auction, the SSP 504 can provide one or more of the DSPs 514 with the web browser cookie the SSP 504 obtained from the client device 504. Like the SSP 504, one or more of the DSPs 514 can use the unique user ID contained in the web browser cookie to request (K) and receive (L) one or more user advertisement preferences (associated with the unique user ID and, thus, also associated the authenticated web browser user) from the user advertisement preference system 512. Using the user advertisement preferences (e.g., products, brands, retailers, services, product/service categories, etc.) obtained (L) from the user advertisement preference system 512, one or more of the DSPs 514 can make more informed bids (M) on the ad slot available on the web page. The DSPs 514 can also utilize the user advertisement preferences in its process of selecting an online advertisement to fill the ad slot available on the web page.

Eventually, the SSP 504 can determine the winning bid and send the client device 506 a redirect (e.g., online advertisement tag) (N) to the winning DSP (e.g., the DSP 514-1). In response, the client device 506 can send a request (O) for online advertisement to the winning DSP (e.g., the DSP 514-1) and the winning DSP can respond (P) to the client device 506 with a redirect (e.g., online advertisement tag) to the marketer's adserver 510. The client device 506 can request (Q) an online advertisement from the marketer's adserver 510, which can provide the client device 506 with an online advertisement (R) to fill the slot. Those skilled in the art will appreciate variations in this process may exist in some implementations.

Figure 6:
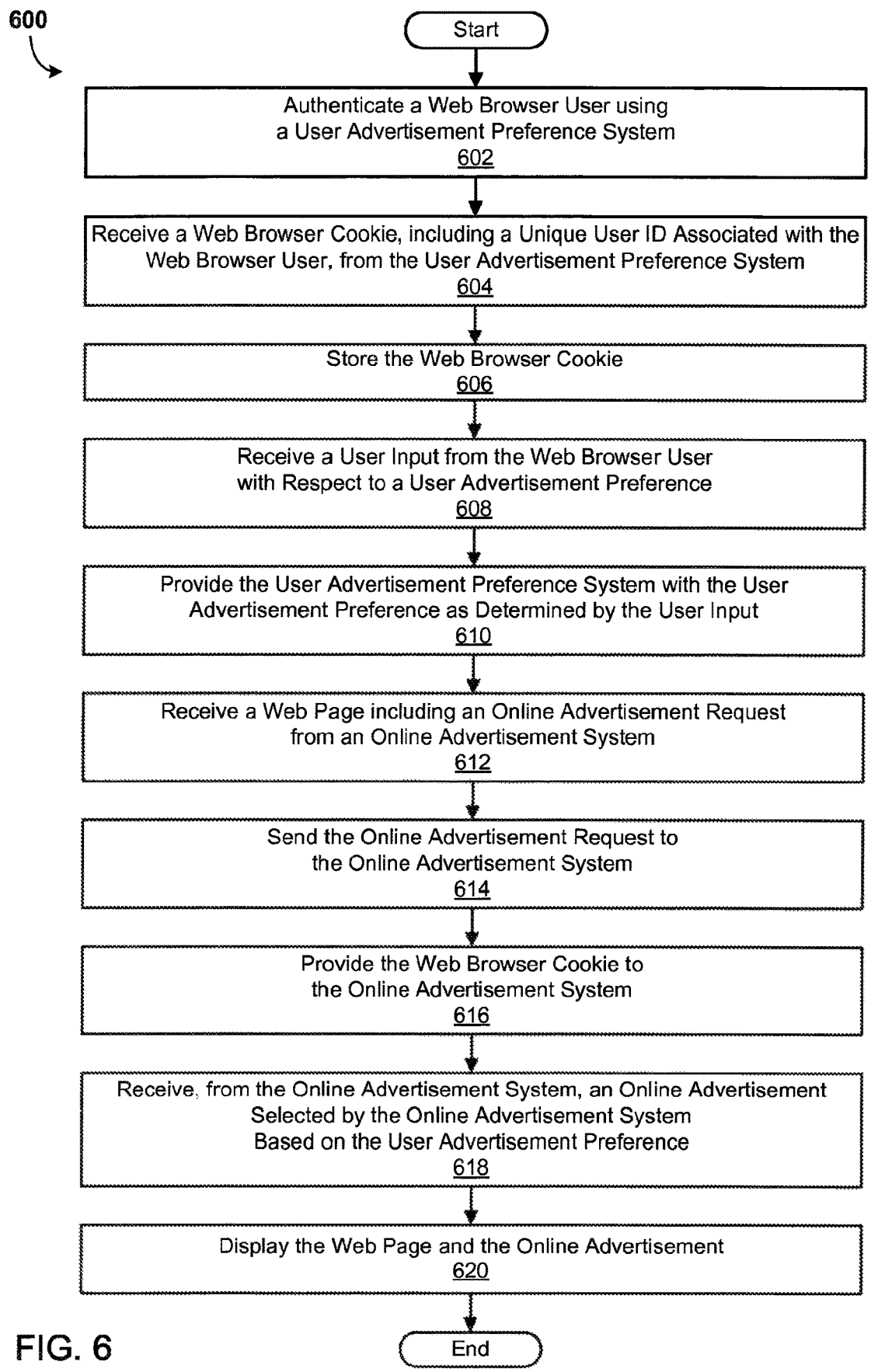
FIG. 6 is a flowchart illustrating an example method for user advertisement preferences in accordance with some implementations.

FIG. 6 is a flowchart 600 illustrating an example method for user advertisement preferences in accordance with some implementations. The method illustrated by the flowchart 600 can be performed, in whole or in part, on a client device in accordance with some implementations. For some implementations, the method illustrated by the flowchart 600 implements client-side functionality as described herein. The flowchart 600 is presented as a series of modules, but, in some implementations, the modules of the flowchart 600 can be reordered to a permutation of the illustrated order of modules or reorganized for parallel execution. The example flowchart 600 shown in FIG. 6 begins at module 602 with a web browser user being authenticated by a user advertisement preference system described herein. The web browser user can be one located at a client device, and authentication using the user advertisement preference system can be facilitated using a client-side engine (e.g., web browser plug-in) included at the client device.

The example flowchart 600 shown in FIG. 6 continues to module 604 with a web browser cookie being received from a user advertisement preference system. The web browser cookie can include a unique user ID that is associated with a web browser user successfully authenticated at module 602. The web browser cookie can also include one or more other variables relating to user advertisement preferences, such as a name-value pair indicating the presence of one or more saved user advertisement preferences on the user advertisement preference system.

The example flowchart 600 shown in FIG. 6 continues to module 606 with the web browser cookie being stored. The web browser cookie can be the one received at module 604, and the web browser cookie can be stored at a datastore local to the client device. In some implementations, the web browser cookie is stored as part of the web browser cache.

The example flowchart 600 shown in FIG. 6 continues to module 608 where a user input being is received, from the web browser user, with respect to a user advertisement preference. For example, a web browser user at a client device may provide one or more user inputs that cause the creation of a new user advertisement preference or a modification to an existing user advertisement preference. The example flowchart 600 shown in FIG. 6 continues to module 610 where the user advertisement preference, as determined (e.g., created or modified) by the user input at module 608, is provided to the user advertisement preference system.

The example flowchart 600 shown in FIG. 6 continues to module 612 where a web page is received, where the web page includes (e.g., HTML or JavaScript code for) an request for online advertisement from an online advertisement system. The example flowchart 600 shown in FIG. 6 continues to module 614 where the request for the online advertisement is sent to the online advertisement system. The example flowchart 600 shown in FIG. 6 continues to module 616 where the web browser cookie, including the unique user ID associated with the authenticated web browser user, is provided to the online advertisement system.

The example flowchart 600 shown in FIG. 6 continues to module 618 where an online advertisement is received from the online advertisement system, where the online advertisement is selected based on the user advertisement preference. For some implementations, the user advertisement preference, used by the online advertisement system in selecting the online advertisement, is obtained by the online advertisement system from a user advertisement preference system using the unique user ID provided in the web browser cookie at module 616.

The example flowchart 600 shown in FIG. 6 continues to module 620 where the web page and the online advertisement, received at module 612, are displayed (e.g., through a web browser at the client device).

Figure 7:
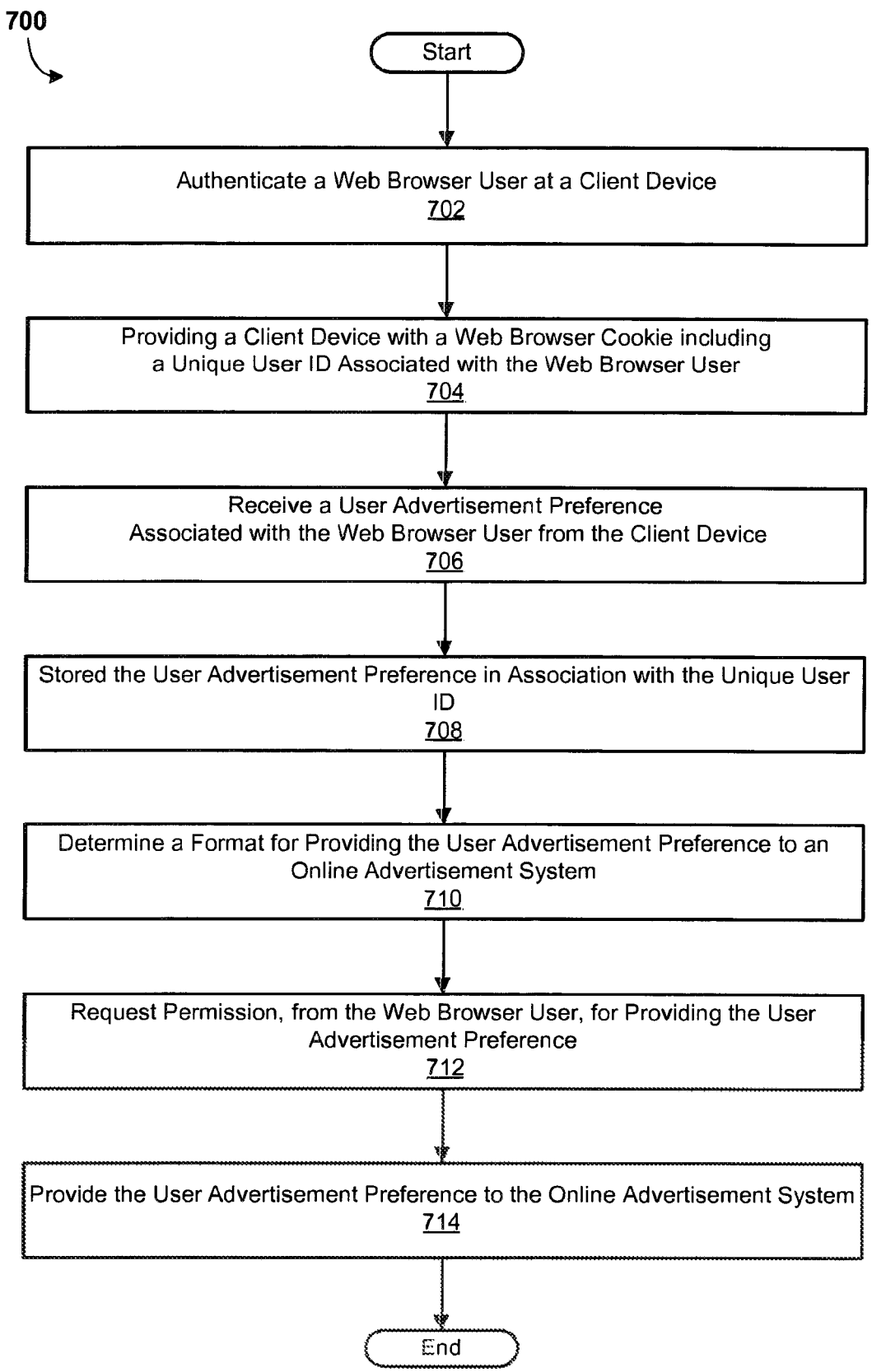
FIG. 7 is a flowchart illustrating an example method for user advertisement preferences in accordance with some implementations.

FIG. 7 is a flowchart 700 illustrating an example method for user advertisement preferences in accordance with some implementations. The method illustrated by the flowchart 700 can be performed, in whole or in part, on a server in accordance with some implementations. For some implementations, the method illustrated by the flowchart 700 implements server-side functionality as described herein. The flowchart 700 is presented as a series of modules, but, in some implementations, the modules of the flowchart 700 can be reordered to a permutation of the illustrated order of modules or reorganized for parallel execution. The example flowchart 700 shown in FIG. 7 begins at module 702 with a web browser user being authenticated by a user advertisement preference system described herein. The web browser user can be one located at a client device, and authentication using the user advertisement preference system can be facilitated using a client-side engine (e.g., web browser plug-in) included at the client device.

The example flowchart 700 shown in FIG. 7 continues to module 704 with a web browser cookie being provided to a client device. The web browser cookie can include a unique user ID that is associated with a web browser user successfully authenticated at module 702. The web browser cookie can also include one or more other variables relating to user advertisement preferences, such as a name-value pair indicating the presence of one or more saved user advertisement preferences on the user advertisement preference system.

The example flowchart 700 shown in FIG. 7 continues to module 706 with a user advertisement preference, associated with a web browser user, being received from a client device. The user advertisement preference received can be one newly created at the client device, or an existing one modified at the client device. The example flowchart 700 shown in FIG. 7 continues to module 708 with the user advertisement preference received at module 706 being stored at a user advertisement preference system. Where the user advertisement preference received at module 706 is a modification to an existing preference, the storing of the user advertisement preference at module 708 can comprise updating the user advertisement preference as saved at the user advertisement preference system.

The example flowchart 700 shown in FIG. 7 continues to module 710 where a format is determined for providing the user advertisement preference to an online advertisement system. In some implementations, the format comprises a set of user advertisement preferences (e.g., array) and a unique user ID associated with the user advertisement preferences.

The example flowchart 700 shown in FIG. 7 continues to module 712 with a user advertisement system requesting permission, from a web browser user, before providing the user advertisement preference. Depending on the implementations, the request can be sent to the web browser user through an electronic message (e.g., SMS, e-mail, instance message, etc.) or through a request that is pushed to and presented through a client-side engine residing at the client device at which the web browser user is currently authenticated.

The example flowchart 700 shown in FIG. 7 continues to module 714 with a user advertisement preference system providing the user advertisement preference to an online advertisement system. Depending on the implementation, the user advertisement preference can be provided to the online advertisement system by the user advertisement preference system pushing the user advertisement preference (e.g., at or near real-time as preferences are created or changed) or can be provided when the online advertisement system request the user advertisement preference (e.g., request based on unique user ID).

Figure 8:
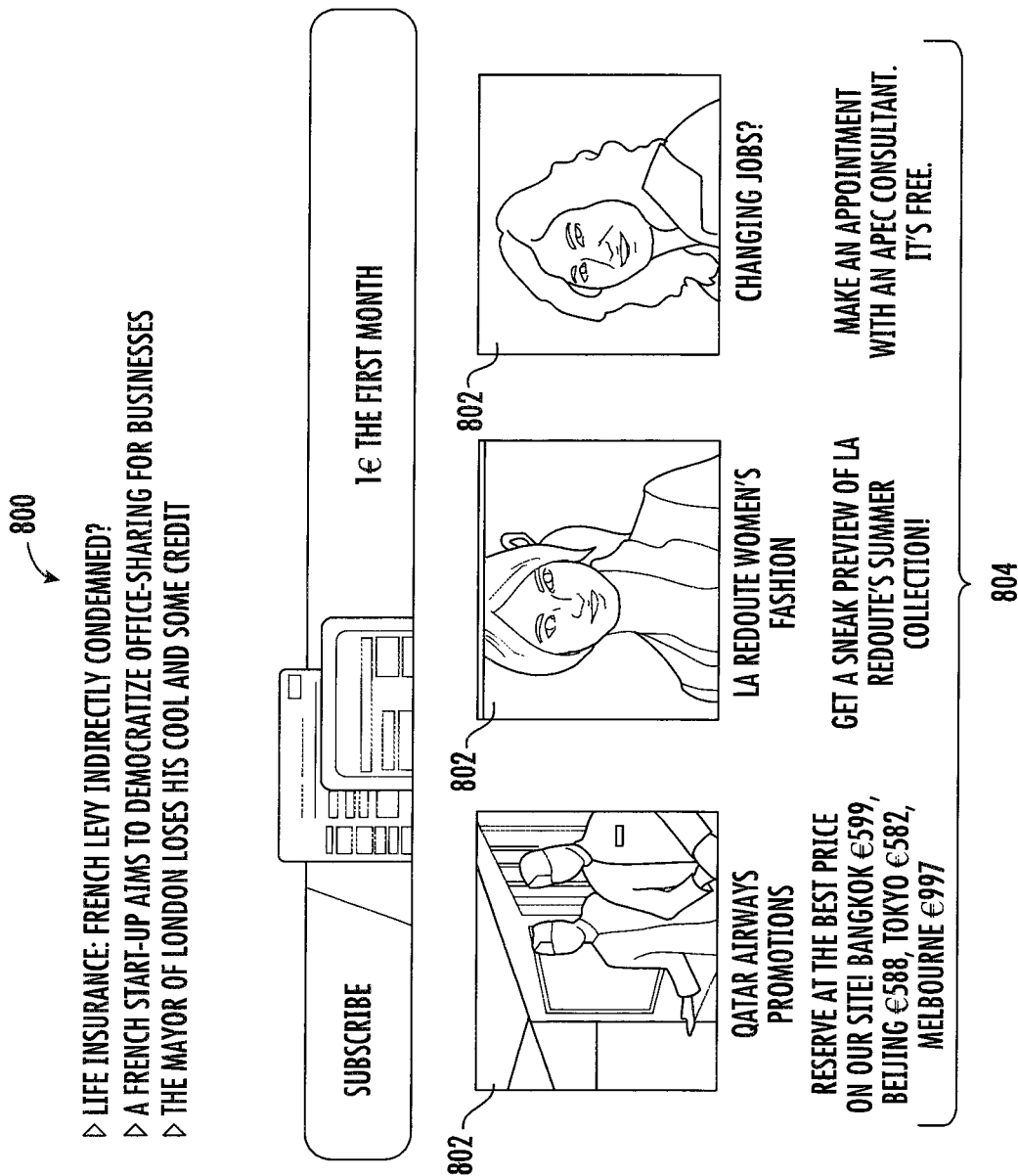
FIG. 8 provides a screenshot of an example graphical user interface for accessing user advertisement preferences in accordance with some implementations.
Figure 9:
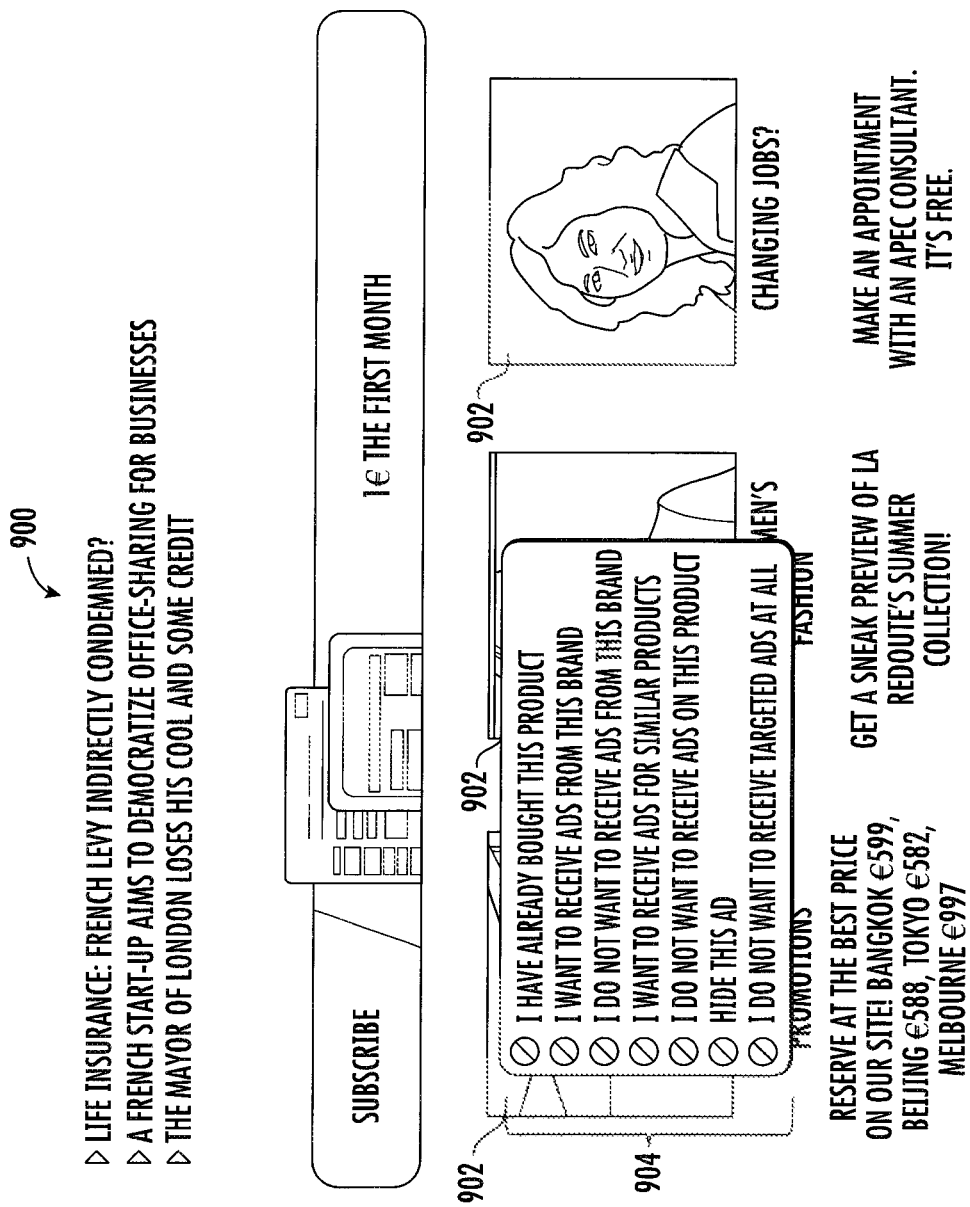
FIG. 9 provides a screenshot of an example graphical user interface for accessing user advertisement preferences in accordance with some implementations.

FIG. 8 provides a screenshot 800 of an example graphical user interface for accessing user advertisement preferences in accordance with some implementations. As illustrated in FIG. 8, the web page includes online advertisements 804 and each of the online advertisements 804 includes an icon (collectively referred to as the icons 802 disposed in the corner. As described herein, the icons 802 can be included when the online advertisements 804 originate from an online advertisement system (e.g., ad network) affiliated with (e.g., subscribed to) a user advertisement preference service as described herein. Additionally, the icons 802 can be included by a web browser plug-in that is included at a client device and configured to detect when online advertisements are displayed on a web page. For some implementations, each of the icons 804 provides access to user advertisement preferences in connection with their respective online advertisement. This is illustrated in FIG. 9, which provides a screenshot 900 of an example graphical user interface for accessing user advertisement preferences in accordance with some implementations. As shown in FIG. 9, when an icon 902 is selected by a web browser user authenticated at a client device, the web browser user can be presented with a graphical user interface (GUI) 904 listing possible user advertisement preference options the web browser user can select.

Figure 10:
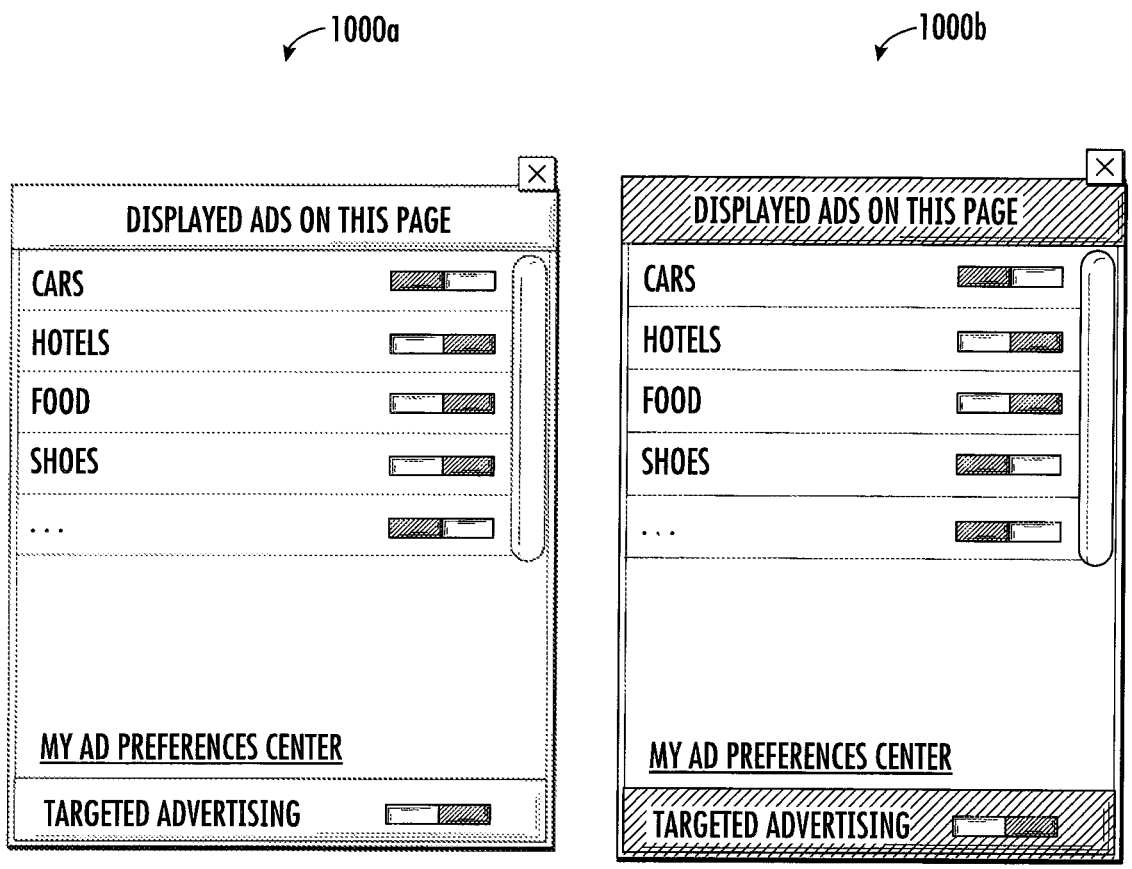
FIGS. 10 and 11 provide screenshots of example graphical user interfaces for accessing user advertisement preferences in accordance with some implementations.
Figure 11:
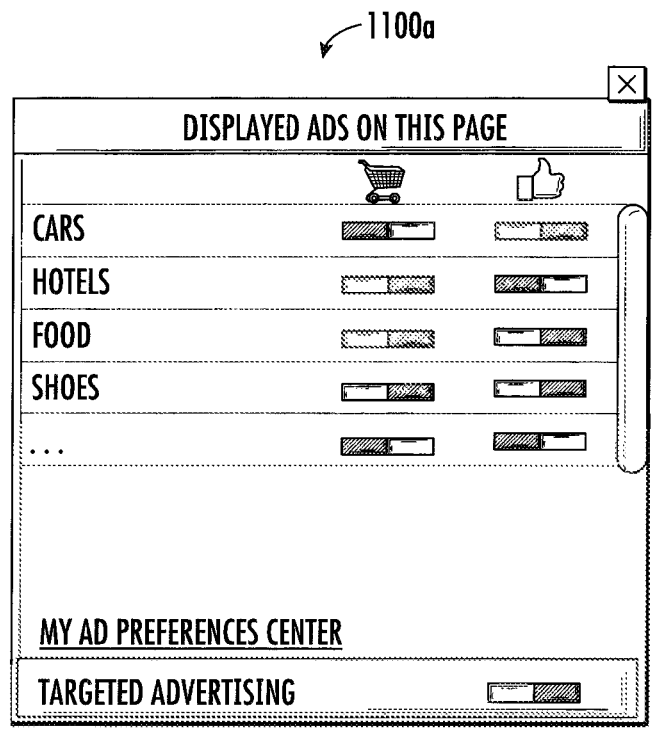
Figure 11:
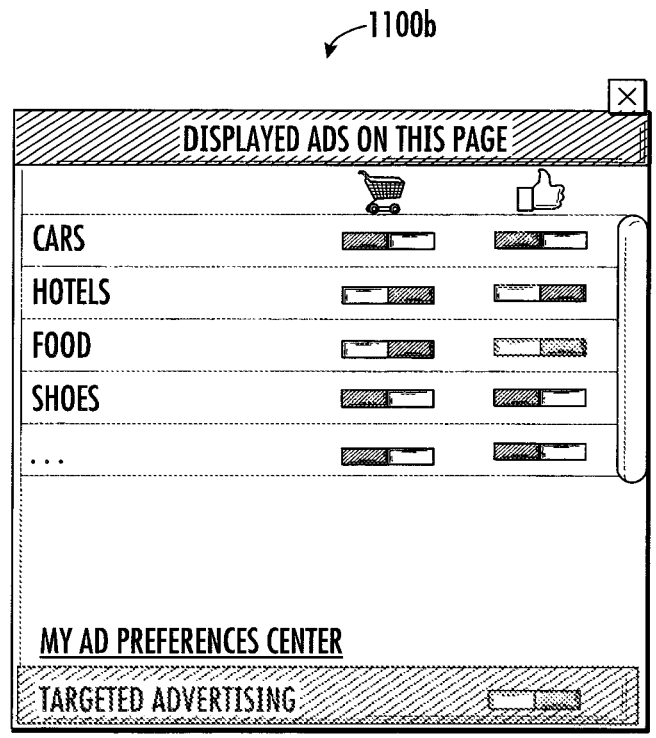

FIGS. 10 and 11 provide screenshots of example graphical user interfaces 1000 and 1100 for accessing user advertisement preferences in accordance with some implementations. In some implementations, the graphical interfaces 1000 and 1100 are presented at a client device by a client-side engine when the client-side engine detects online advertisements on a web page and determines a listing of user advertisement preferences related to the detected online advertisements. As shown in FIG. 10, the graphical user interfaces 1000*a* and 1000*b* illustrate different selections by a web browser user with respect to user advertisement preferences relating to cars, hotels, foods, and shoes. Likewise, in FIG. 11, the graphical user interfaces 1100*a* and 1100*b*, also illustrate different selections by a web browser user with respect to user advertisement preferences relating to cars, hotels, foods, and shoes. Unlike the graphical user interfaces 1000*a* and 1000*b*, the graphical user interfaces 1100*a* and 1100*b* allow a web browser user to select, as user advertisement preferences, which of product categories (e.g., cars, hotels, foods, and shoes) the web browser user has purchased (or would like to purchase) and which of the product categories the web browser user likes.

Figure 12:
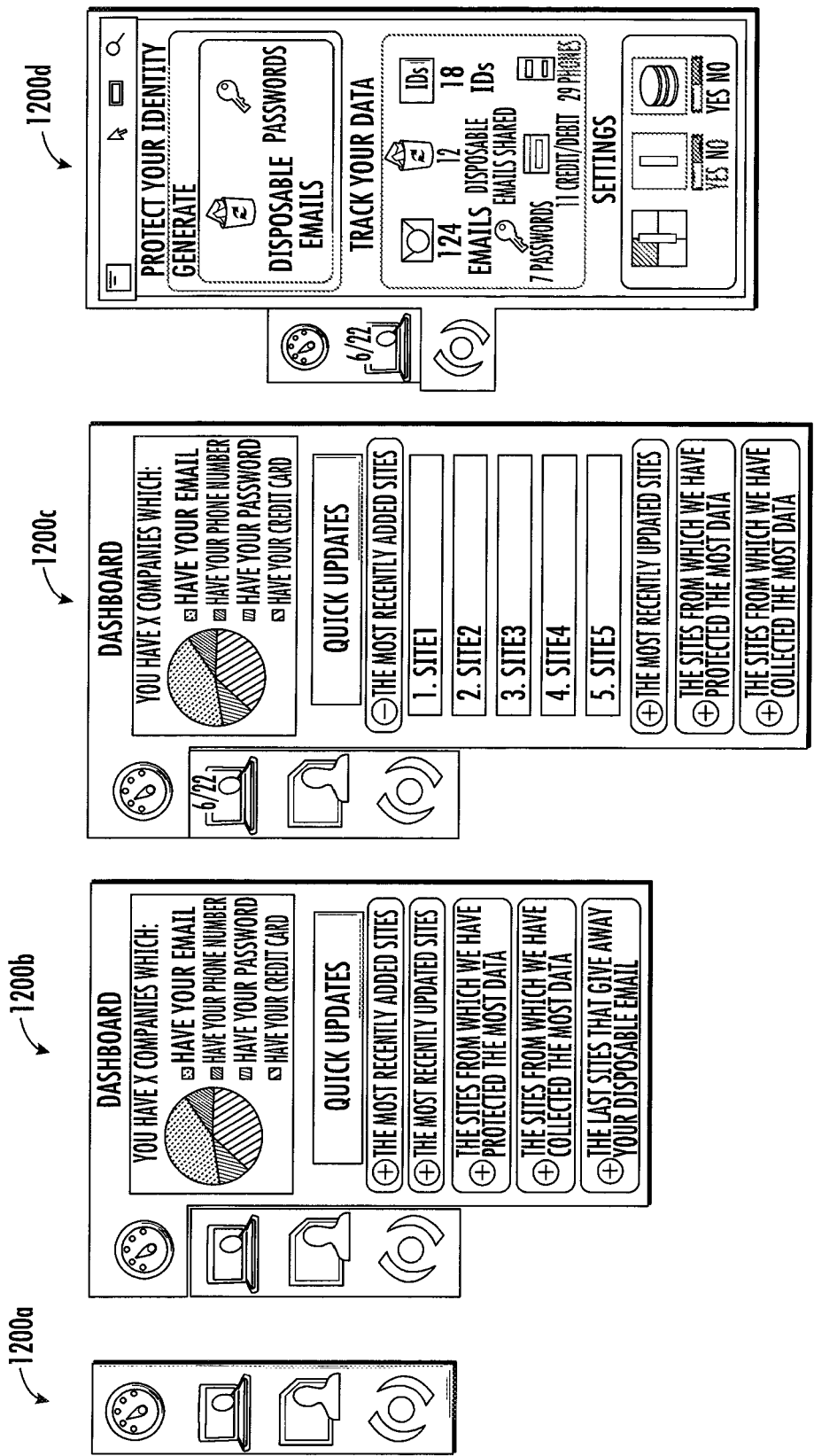
FIGS. 12 and 13 provide screenshots of example graphical user interfaces for accessing and interacting with a user advertisement preference system in accordance with some implementations.
Figure 13:
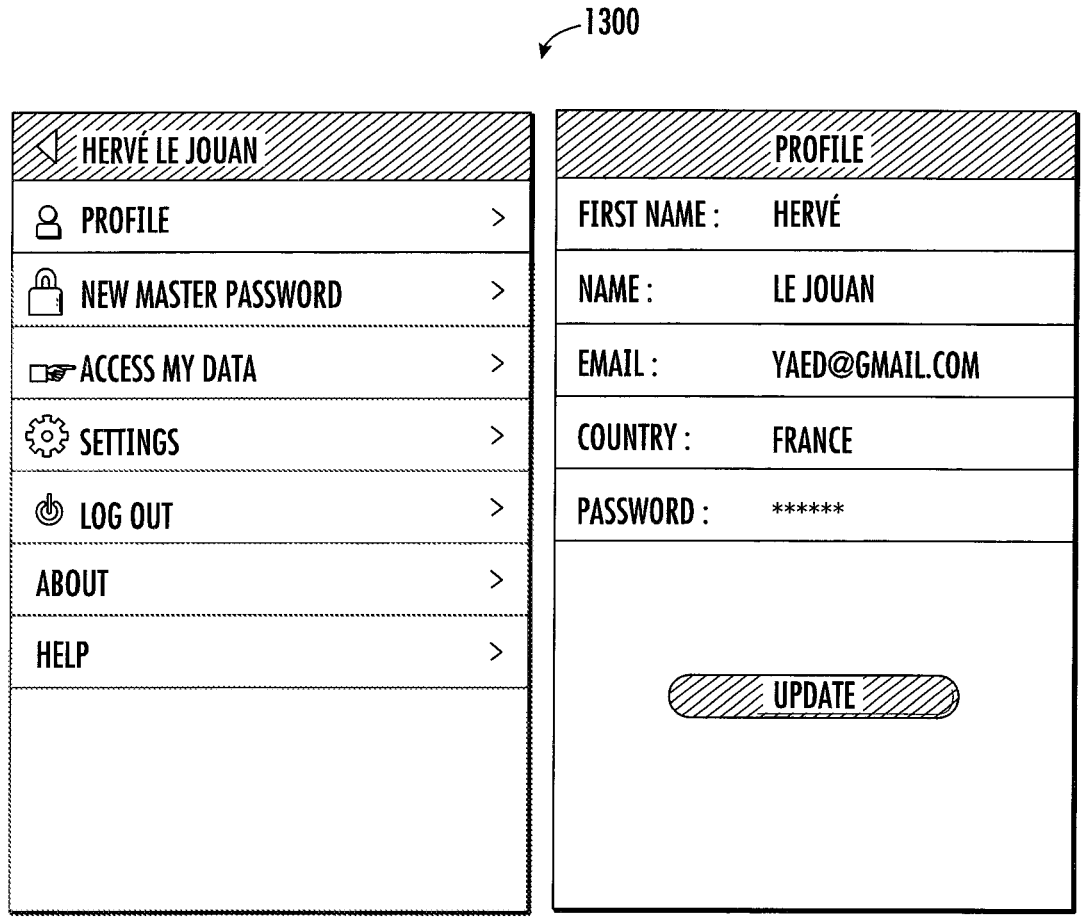

FIGS. 12 and 13 provide screenshots of example graphical user interfaces 1200*a*, 1200*b*, 1200*c*, and 1200*d* for accessing and interacting with a user advertisement preference system in accordance with some implementations. In FIG. 12, the graphical user interface 1200*a* illustrates a floating menu bar that can be presented at a client device by a client-side engine. Through the graphical user interfaces 1200a, 1200b, 1200c, and 1200d, a web browser user can analyze (among other things) metrics relating to third parties that have access to the web browser user's user advertisement preferences. In FIG. 13, the graphical user interface 1300 illustrates a menu that can be presented at a client device by a client-side engine and utilized by a web browser user to access their account settings.

As used herein, the term "set" may refer to any collection of elements, whether finite or infinite. The term subset may refer to any collection of elements, wherein the elements are taken from a parent set; a subset may be the entire parent set. The term proper subset refers to a subset containing fewer elements than the parent set.

As used herein, the term "implementation" means an implementation that serves to illustrate by way of example but not limitation. The techniques described in the preceding text and figures can be mixed and matched as circumstances demand to produce alternative implementations.

The invention claimed is:

1. A method comprising:

identifying, by a user advertisement preference system, a user operating a web browser on a client device, the client device including at least one processor, memory, the web browser, and a plugin in communication with the web browser and with the user advertisement preference system, the client device being remote from the user advertisement preference system;

providing, by the user advertisement preference system, the client device with a unique user identifier associated with the user for a web browser cookie that includes the unique user identifier and includes an indicator variable comprising at least two states, a first state indicating the user advertisement preference system includes at least one user advertisement preference associated with the unique user identifier and a second state indicating the user advertisement preference system includes no user advertisement preferences associated with the unique user identifier, the web browser cookie containing no user-identifying information capable of identifying the user to any online advertisement-provider system, the web browser cookie being stored on the client device, the web browser cookie configured to be provided from the client device to a web server operating a web page that includes at least one online advertisement request, the web server being remote from the client device;

receiving, by the user advertisement preference system from the plugin, at least one user advertisement preference specified by the user, the at least one user advertisement preference indicating preferred or unpreferred advertisements, the at least one user advertisement preference being specified by the user based on first user input received through a user interface being displayed while an online advertisement is currently being presented through the web browser, the plugin configured to provide the at least one user advertisement preference to the user advertisement preference system;

updating the indicator variable included in the web browser cookie to the first state indicating the user advertisement preference system includes at least one user advertisement preference, the web browser cookie not being updated to contain the at least one user advertisement preference;

storing, by the user advertisement preference system, the at least one user advertisement preference in association with the unique user identifier;

receiving, by the user advertisement preference system, a request from an online advertisement-provider system, the request including the unique user identifier from the web browser cookie, the online advertisement-provider system receiving the unique user identifier from the web browser, the at least one online advertisement-provider system being remote from the user advertisement preference system, remote from the web server, and remote from the client device;

retrieving, by the user advertisement preference system, the stored at least one user advertisement preference associated with the unique user identifier; and providing, by the user advertisement preference system, the stored at least one user advertisement preference to the online advertisement-provider system without providing any user-identifying information capable of identifying the user to the at least one online advertisement-provider system, the at least one online advertisement-provider system being capable of determining one or more user-targeted online advertisements to be presented to the user based at least in part on the at least one user advertisement preference.

2. The method of claim 1, wherein the receiving, by the user advertisement preference system, the at least one user advertisement preference specified by the user includes receiving the at least one user advertisement preference from the plugin on the client device, the at least one user advertisement preference being specified in response to a user interface generated by the plugin in response to selection by the user of an icon in at least one first online advertisement presented to the user.

3. The method of claim 2, wherein the at least one user advertisement preference indicates at least one preference for or against advertisements that share one or more characteristics with the at least one first online advertisement.

4. The method of claim 3, wherein the one or more characteristics correspond to a product, a service, a product category, a service category, a manufacturer, a service provider, a retailer, or price.

5. The method of claim 1, wherein the receiving, by the user advertisement preference system, the at least one user advertisement preference specified by the user includes receiving the at least one user advertisement preference from the plugin on the client device, the at least one user advertisement preference being specified in response to a user interface generated by the plugin in response to selection by the user of an icon in at least one first online advertisement presented to the user.

6. The method of claim 1, wherein the storing the at least one user advertisement preference in association with the unique user identifier comprises storing the at least one user advertisement preference in association with the user.

7. The method of claim 1, further comprising requesting authorization, from the user, for providing the at least one user advertisement preference to the online advertisement-provider system.

8. A user advertisement preference system, comprising:

one or more processors;

memory storing instructions that, when executed by the one or more processors, cause the user advertisement preference system to perform:

identifying a user operating a web browser on a client device, the client device including at least one processor, memory, the web browser, and a plugin in communication with the web browser and with the user advertisement preference system, the client device being remote from the user advertisement preference system;

providing the client device with a unique user identifier associated with the user for a web browser cookie that includes the unique user identifier and includes an indicator variable comprising at least two states, a first state indicating the user advertisement preference system includes at least one user advertisement preference associated with the unique user identifier and a second state indicating the user advertisement preference system includes no user advertisement preferences associated with the unique user identifier, the web browser cookie containing no user-identifying information capable of identifying the user to any online advertisement-provider system, the web browser cookie being stored on the client device, the web browser cookie configured to be provided from the client device to a web server operating a web page that includes at least one online advertisement request, the web server being remote from the client device;

receiving from the plugin at least one user advertisement preference specified by the user, the at least one user advertisement preference indicating preferred or unpreferred advertisements, the at least one user advertisement preference being specified by the user based on first user input received through a user interface being displayed while an online advertisement is currently being presented through the web browser, the plugin configured to provide the at least one user advertisement preference to the user advertisement preference system;

updating the indicator variable included in the web browser cookie to the first state indicating the user advertisement preference system includes at least one user advertisement preference, the web browser cookie not being updated to contain the at least one user advertisement preference;

storing the at least one user advertisement preference in association with the unique user identifier;

receiving a request from an online advertisement-provider system, the request including the unique user identifier from the web browser cookie, the online advertisement-provider system receiving the unique user identifier from the web browser, the at least one online advertisement-provider system being remote from the user advertisement preference system, remote from the web server, and remote from the client device;

retrieving the stored at least one user advertisement preference associated with the unique user identifier; and providing the stored at least one user advertisement preference to the online advertisement-provider system without providing any user-identifying information capable of identifying the user to the at least one online advertisement-provider system, the at least one online advertisement-provider system being capable of determining one or more user-targeted online advertisements to be presented to the user based at least in part on the at least one user advertisement preference.

9. The user advertisement preference system of claim 8, wherein the instructions causing the user advertisement preference system to perform receiving the at least one user advertisement preference specified by the user include instructions causing the user advertisement preference system to perform receiving the at least one user advertisement preference from the plugin on the client device, the at least one user advertisement preference being specified in response to a user interface generated by the plugin in response to at least one first online advertisement presented to the user.

10. The user advertisement preference system of claim 9, wherein the at least one user advertisement preference indicates at least one preference for or against advertisements that share one or more characteristics with the at least one first online advertisement.

11. The user advertisement preference system of claim 10, wherein the one or more characteristics correspond to a product, a service, a product category, a service category, a manufacturer, a service provider, a retailer, or price.

12. The user advertisement preference system of claim 8, wherein the instructions causing the user advertisement preference system to perform receiving the at least one user advertisement preference specified by the user include instructions causing the user advertisement preference system to perform receiving the at least one user advertisement preference from the plugin on the client device, the at least one user advertisement preference being specified in response to a user interface generated by the plugin in response to selection by the user of an icon in at least one first online advertisement presented to the user.

13. The user advertisement preference system of claim 8, wherein the instructions causing the user advertisement preference system to perform storing the at least one user advertisement preference in association with the unique user identifier include instructions causing the user advertisement preference system to perform storing the at least one user advertisement preference in association with the user.

14. The user advertisement preference system of claim 8, wherein the instructions, when executed by the one or more processors, further cause the user advertisement preference system to perform requesting authorization, from the user, for providing the at least one user advertisement preference to the online advertisement-provider system.

* * * * *